United States Patent [19]

Bradley

[11] Patent Number: 5,735,484
[45] Date of Patent: Apr. 7, 1998

[54] HELICOPTER SKID

[75] Inventor: James Bradley, Sidney, British Columbia, Canada

[73] Assignee: Nosterra Holdings Ltd., Sidney, B.C. Canada

[21] Appl. No.: 622,548

[22] Filed: Mar. 25, 1996

[51] Int. Cl.⁶ .................................................. B64C 25/52
[52] U.S. Cl. ........................................ 244/108; 244/100
[58] Field of Search .................................. 244/100, 108

[56] References Cited

U.S. PATENT DOCUMENTS

| | | | |
|---|---|---|---|
| 2,539,817 | 1/1951 | Ditter | 244/108 |
| 5,211,359 | 5/1993 | Rene et al. | 244/108 |
| 5,358,201 | 10/1994 | Brown, Sr. | 244/108 |
| 5,462,242 | 10/1995 | Collins et al. | 244/108 |

*Primary Examiner*—Virna Lissi Mojica
*Attorney, Agent, or Firm*—Nathan Epstein

[57] ABSTRACT

A helicopter skid having a wall defining an elongated generally cylindrical tubular cross section, and a web extending vertically along the longitudinal axis of the skid between a bottom portion and a top portion of the wall. The top and the bottom portions of the wall have a tapering thickness with maxima where the web meets the top and bottom portions. The web is preferably formed integrally with the wall. A horizontal member formed integrally with the side portions of the wall of the tube extends horizontally through an aperture in the web.

5 Claims, 4 Drawing Sheets

HELICOPTER SKID

FIELD OF THE INVENTION

This invention relates to skid type landing gear for helicopters.

BACKGROUND OF THE INVENTION

It is known in the art of helicopter skids to construct the skid of a hollow tubular member which is connected to the landing struts of the helicopter. Due to the risk of puncturing the skids and in order to distribute some of the stress of the weight of the helicopter throughout the tubular member, increased thickness is sometimes provided at the top and bottom portions of the member. Nonetheless, stress tests show that such prior art structures are susceptible to relatively high and uneven stresses. An alternative means of reducing such stress in the prior art has been to provide hydraulic apparatus between the skid and the frame of the helicopter.

It is an object of this invention to provide a simple means of strengthening skid type landing gear for helicopters and to provide a skid structure wherein the stresses are distributed more evenly throughout the skid thereby extending its useful life.

SUMMARY OF THE INVENTION

In one aspect, the invention comprises a helicopter skid having a wall defining an elongated generally cylindrical tube, and a web extending vertically along the longitudinal axis of the skid between a bottom portion and a top portion of the wall.

In another aspect the invention comprises such a skid wherein the top and the bottom portions of the wall have a tapering thickness with maxima where the web meets the top and bottom portions and wherein the thickness tapers with angular displacement along the wall away from the vertical axis of the web.

In a further aspect, the invention further comprises a thickened portion along each of the sides of the tube.

In yet a further aspect, the invention further comprises a plurality of horizontal members extending along the horizontal axis of the tube between the sides of the tube at regular intervals throughout the longitudinal extent of the tube.

DETAILED DESCRIPTION OF THE PREFERRED EMBODIMENT

The invention may be fully appreciated by reference to the detailed description which follows in conjunction with the drawings in which.

Figure 1:
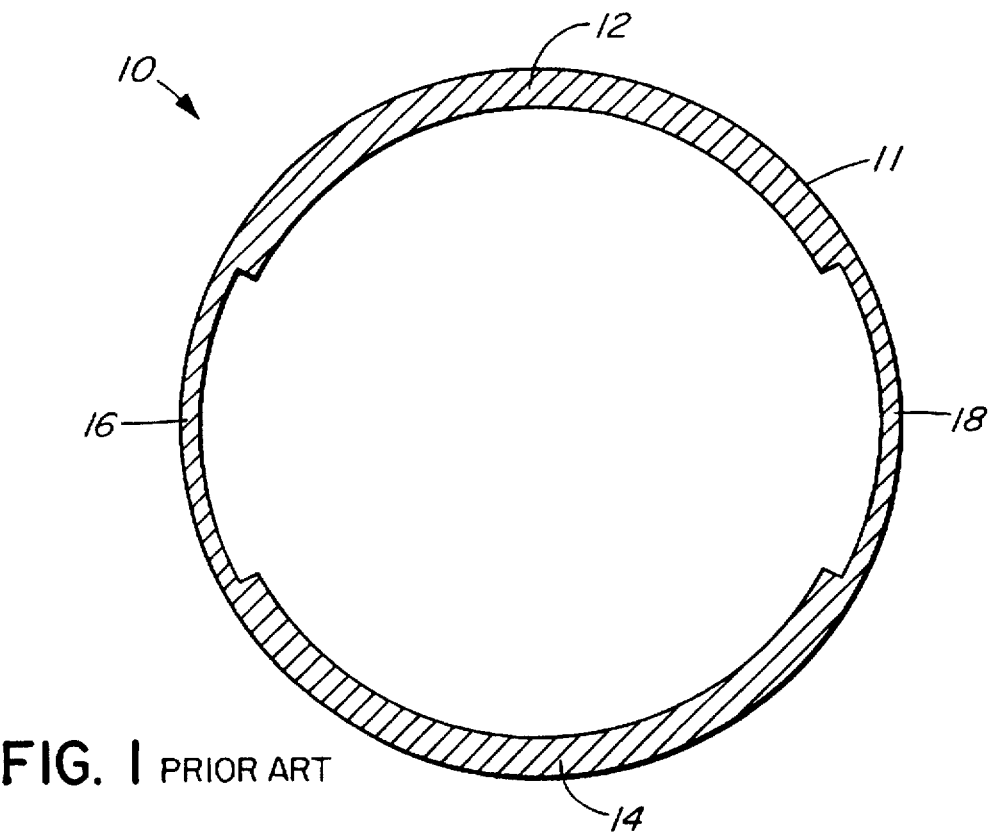
FIG. 1 is a cross-sectional view of a tubular helicopter skid according to the prior art.

Referring first to FIG. 1, there is shown a typical prior art helicopter skid 10. The skid consists of an elongated tube 11. The top portion 12 and the bottom portion 14 of the tube are thickened relative to the side portions 16 and 18 so as to enable the skid to substantially retain its integrity when the skid hits rocks or sharp objects upon landing and to distribute the stresses throughout the skid. However, such prior art structure is not particularly effective in distributing the stress which the skid suffers upon landing. In such cases, the skid is susceptible to relatively high stresses particularly at the bottom portion 14 and consequently it is still relatively susceptible to puncturing.

Figure 2:
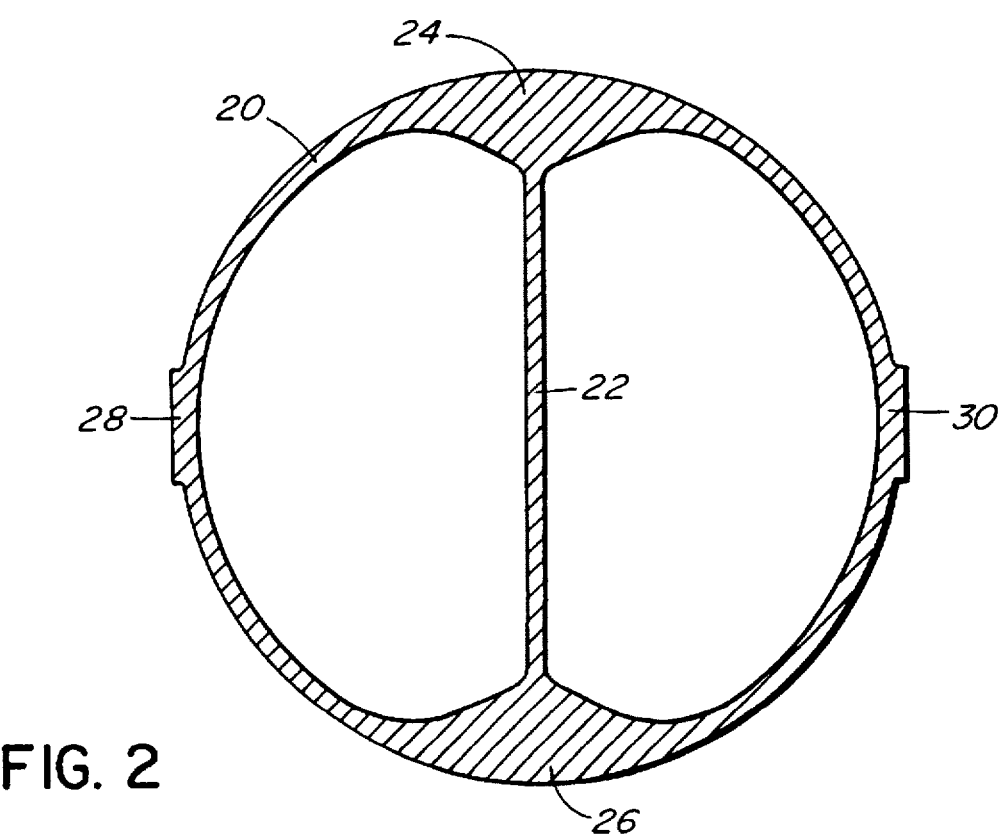
FIG. 2 is a cross-sectional view of a helicopter skid according to a first embodiment of the invention.

FIG. 2 is a cross-sectional view of a skid according to a first embodiment of the invention. The skid consists of a straight, elongated, cylindrical tube having a wall 20 made of a suitable material such as aluminium alloy.

A vertical web 22 extends substantially throughout the length of the tube along the tube's longitudinal axis between top apex on portion 24 and bottom apex on portion 26.

Top portion 24 and bottom portion 26 of the wall include a gradual and tapered thickening which is at its maximum along the vertical axis of web 22 where the web meets the top and bottom portions 24 and 26, and the thickness tapers with angular displacement along the wall away from the vertical axis. Web 22 is preferably formed integrally with the thickened top and bottom portions 24 and 26 but the principle of the invention applies in the case of an insertable web-like piece which would be inserted or otherwise placed within the tube in sufficient contact with the thickened walls of the top and bottom portions to distribute the stresses therethrough.

Thicker portions 28 and 30 of the wall 20 are provided along the sides of the tube. Without portions 28 and 30, the structure of FIG. 2 would have a 10% increase in vertical bending stiffness and a 7.5% decrease in horizontal bending stiffness as compared to the structure of FIG. 1. The addition of portions 28 and 30 provide additional rigidity against bending in the horizontal plane. Portions 28 and 30 are also useful to provide a surface for connecting the cross bolts used to attach the landing struts to the skid.

Figure 3:
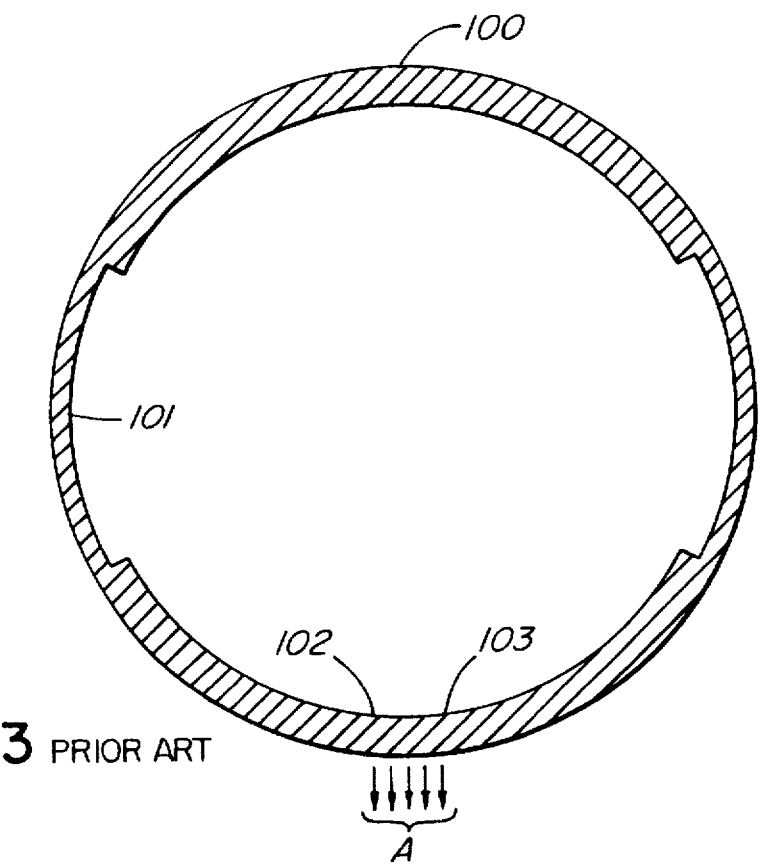
FIG. 3 is a cross-sectional view of the structure in FIG. 1 under a certain bottom load condition wherein stress measurements are indicated by reference to Table I below.
Figure 4:
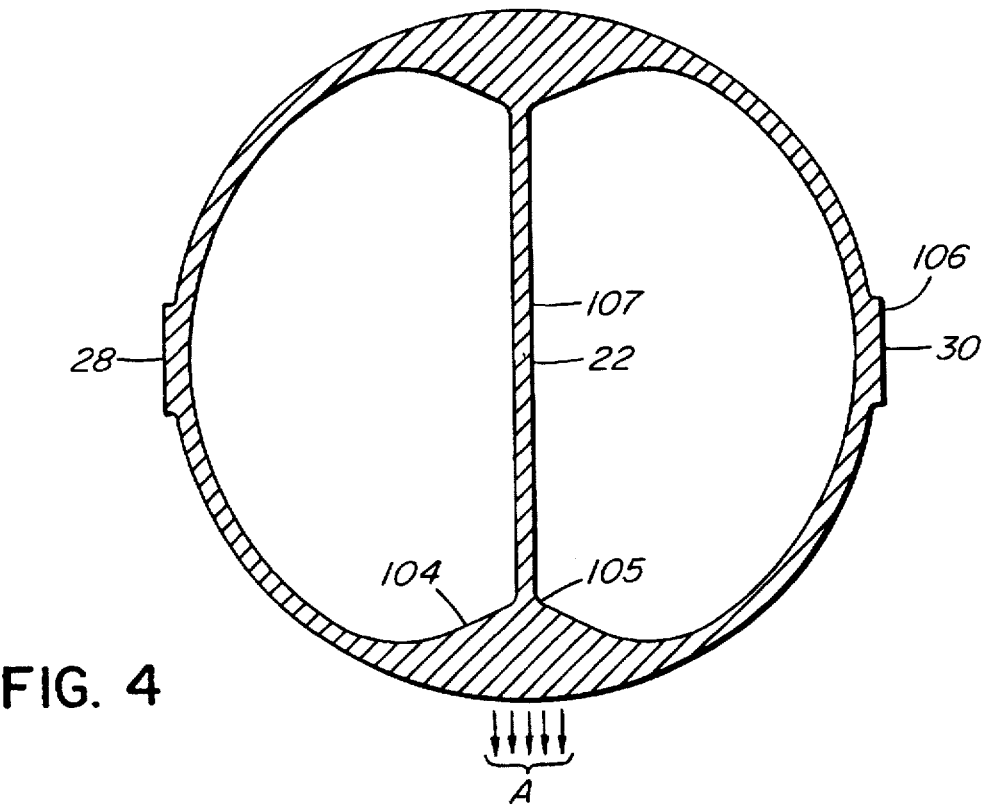
FIG. 4 is a cross-sectional view of the structure in FIG. 2 under the same load condition as in FIG. 3 wherein stress measurements are indicated by reference to Table I below.

Stress simulation test results demonstrate that the structure according to the invention provides significantly better distribution of the stresses applied to the skid upon landing. The results of such tests for the structures of FIG. 1 and FIG. 2 are illustrated in FIG. 3. and FIG. 4 respectively in conjunction with Table I below wherein the stress measurements are shown for the location(s) indicated by each numeral.

TABLE I

| Numeral | lbs/in$^2$ |
| --- | --- |
| 100 | 590,000 |
| 101 | 250,000 |
| 102 | 90,000 |
| 103 | 300,000 |
| 104 | 9,000 |
| 105 | 25,000 |

TABLE I-continued

| Numeral | lbs/in² |
|---|---|
| 106 | 2,000 |
| 107 | 40,000 |
| 108 | 50,000 |
| 109 | 10,000 |
| 110 | 110,000 |
| 111 | 180,000 |
| 112 | 210,000 |
| 113 | 30,000 |
| 114 | 65,000 |
| 115 | 165,000 |
| 116 | 105,000 |
| 117 | 100,000 |
| 118 | 70,000 |
| 119 | 36,000 |
| 120 | 5,000 |
| 121 | 20,000 |

In the prior art structure of FIG. 1, when a pressure of 6000 lbs. is applied to the bottom of the skid over an area of ⅛"×1½" (area A), the highest stresses occur in the area of the load application and have a magnitude of about 300,000 psi. In the region of the sides 16 and 18 of the structure, the stresses have a magnitude of about 250,000 psi. In the structure of FIG. 2, with the same load applied in the same area A, the stresses are distributed in the web 22, with maximum stresses having a magnitude of about 40,000 psi being in the region of the web itself. It will therefore be appreciated that the structure according to the invention provides a substantially improved stress distribution characteristic while improving puncture resistance of the skids upon landing.

Figure 5:
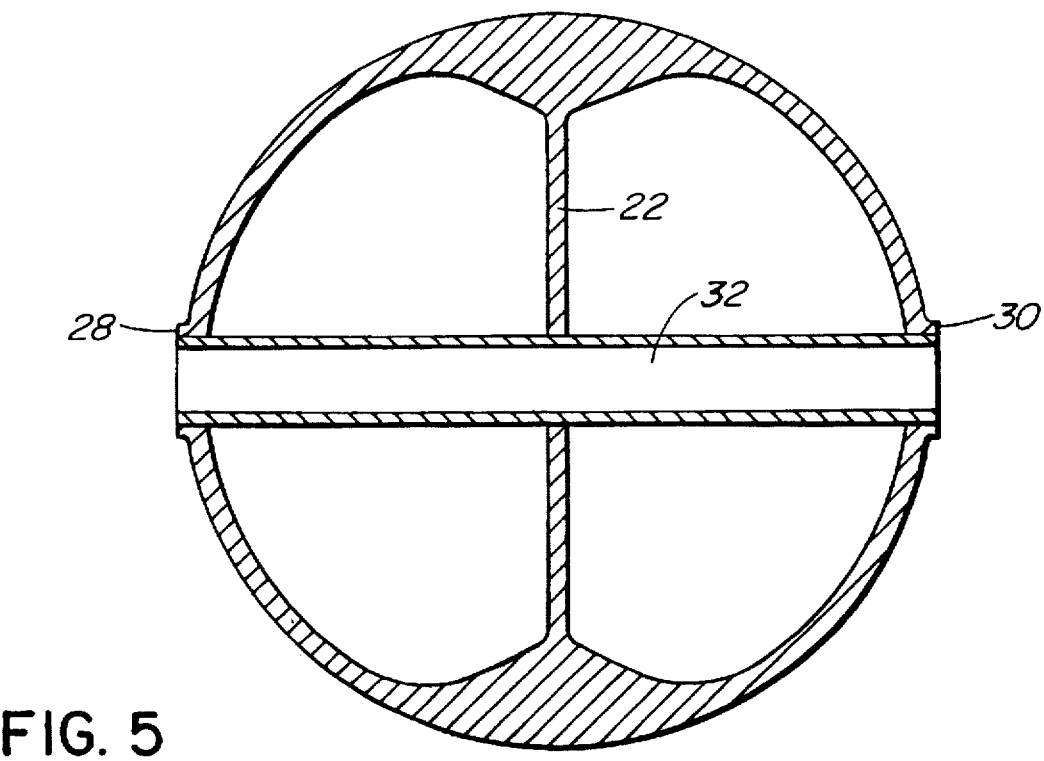
FIG. 5 is a cross-sectional view of a helicopter skid according to the preferred embodiment of the invention.

FIG. 5 illustrates the preferred embodiment of the skid according to the invention. In the preferred embodiment, horizontal members 32 extend horizontally between the thickened portions 28 and 30 of the skid at regular intervals throughout the longitudinal extent of the skid. Horizontal members 32 are preferably hollow tubes formed integrally with portions 28 and 30 of the wall and which pass through suitable apertures in the web 22.

Figure 6:
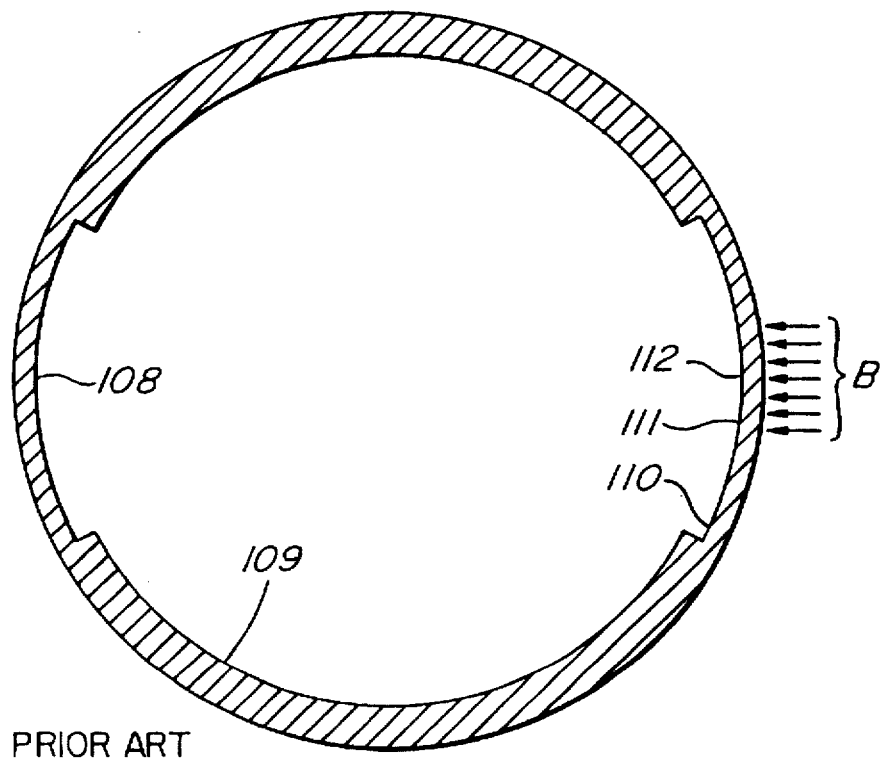
FIG. 6 is a cross-sectional view of the structure in FIG. 1 under a certain side load condition wherein stress measurements are indicated by reference to Table I below.
Figure 7:
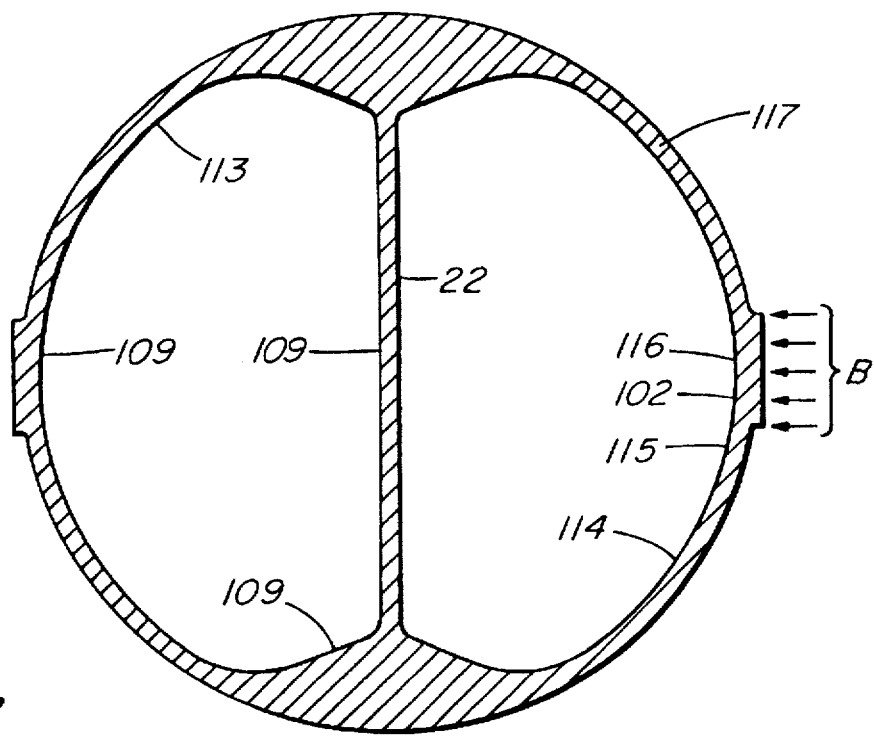
FIG. 7 is a cross-sectional view of the structure in FIG. 2 under the same load condition as in FIG. 6 wherein stress measurements are indicated by reference to Table I below; and, FIG. 8 is a cross-sectional view of the structure in FIG. 5 under the same load condition as in FIG. 6 wherein stress measurements are indicated by reference to Table I below.
Figure 8:
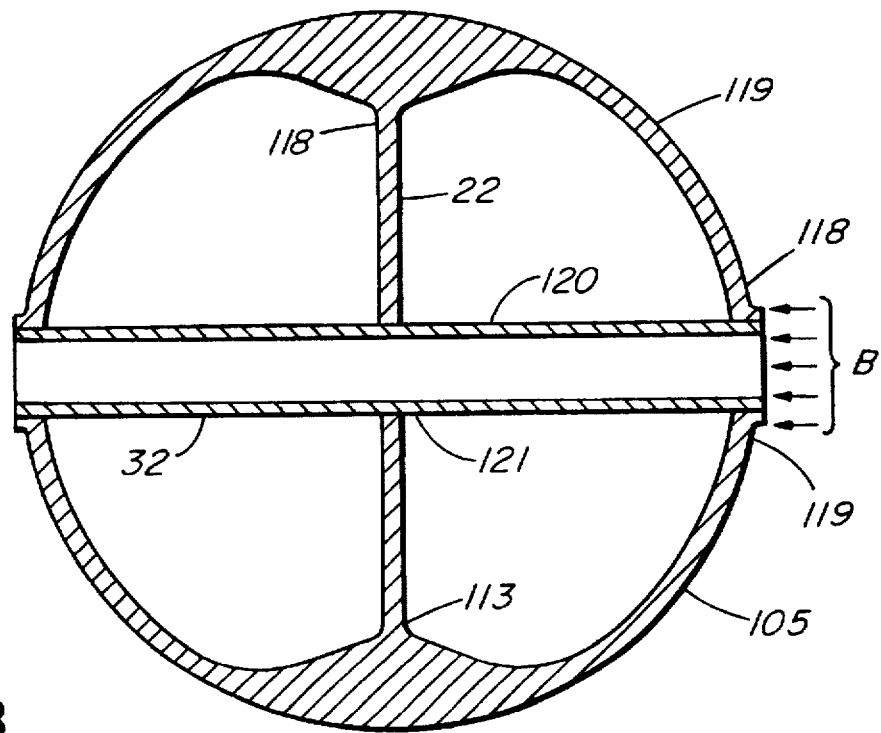

Stress simulation test results demonstrate that the preferred embodiment distributes stress throughout the structure better than either of the preferred embodiment or the structure of the prior art when a side load is applied. The results of such tests for the structures of FIG. 1, FIG. 2 and FIG. 5 are illustrated in FIG. 6, FIG. 7 and FIG. 8 respectively in conjunction with table I. In the prior art structure of FIG. 1, when a pressure of 3000 lbs is applied to one of the side walls of the skid over an area of ⅜"×2½" (area B), the highest stresses occur in the region where the load is applied and have a magnitude of approximately 210,000 psi. In the first embodiment of FIG. 2 with the same load applied in the same area B, the maximum stresses having a magnitude of about 165,000 psi occur in the region next to the thicker portion on the side that the load was applied. In the preferred embodiment of FIG. 5 with the same load applied in the same area B, the maximum stresses having a magnitude of only 70,000 psi occur in both the region next to the thicker portion on the side that the load was applied and the region of web 20 next to the top portion of the wall. It will therefore be appreciated that the structure according to the preferred embodiment also provides a substantially improved stress distribution characteristic when a load is applied to the side of the skids.

It will be appreciated by those skilled in the art that certain variations of the first and preferred embodiments of the invention may be practised without departing from the principles thereof.

I claim:

1. A helicopter skid having a wall defining an elongated cylindrical tube, said wall having a top portion and a bottom portion including top and bottom vertical apexes, and said skid including a web extending vertically along the longitudinal axis and between said vertical apexes of the tube.

2. Apparatus as in claim 1 wherein said top and bottom portions have a thickness with maxima where the web meets said top and bottom portions and wherein said thickness tapers gradually with angular displacement along the wall away from the vertical axis of the web.

3. Apparatus as in claim 1 wherein the web is formed integrally with said wall.

4. Apparatus as in claim 3 wherein the wall includes a thickened portion along each of the sides of the tube.

5. Apparatus as in claim 4 further comprising a plurality of horizontal members extending along the horizontal axis of the tube between the sides of the tube at regular intervals throughout the longitudinal extent of the tube.

* * * * *